United States Patent [19]

List

[11] 3,890,940
[45] June 24, 1975

[54] INTERNAL COMBUSTION ENGINE WITH INDIRECT FUEL INJECTION

[76] Inventor: Hans List, 126 Heinrichstrasse, Graz, Austria

[22] Filed: May 25, 1973

[21] Appl. No.: 364,530

[30] Foreign Application Priority Data
May 25, 1972 Austria .............................. 4554/72

[52] U.S. Cl. ........ 123/32 C; 123/32 AA; 123/32 L; 123/32 SP; 123/191 S; 123/191 SP
[51] Int. Cl. ............................................. F02b 23/08
[58] Field of Search ......... 123/32 SP, 33 VC, 32 SJ, 123/32 K, 32 L, 32 C, 191 S, 191 SP

[56] References Cited
UNITED STATES PATENTS

| | | | |
|---|---|---|---|
| 1,544,524 | 6/1925 | Banner | 123/32 F |
| 1,634,132 | 6/1927 | Banner | 123/32 F |
| 1,642,137 | 9/1927 | Banner | 123/32 F |
| 2,436,090 | 2/1948 | Bodine, Jr. | 123/32 SPJ |
| 2,741,229 | 4/1956 | Stump | 123/32 C |
| 2,766,738 | 10/1956 | Hoffmann | 123/32 C |

*Primary Examiner*—Charles J. Myhre
*Assistant Examiner*—Tony Argenbright
*Attorney, Agent, or Firm*—Watson, Cole, Grindle & Watson

[57] ABSTRACT

An internal combustion engine with indirect fuel injection comprising an antechamber or turbulence chamber connected with the combustion chamber portion located above the piston by means of at least two overflow apertures whose axes cross or intersect in the portion of the combustion chamber located above the piston.

3 Claims, 1 Drawing Figure

PATENTED JUN 24 1975　　　　　3,890,940
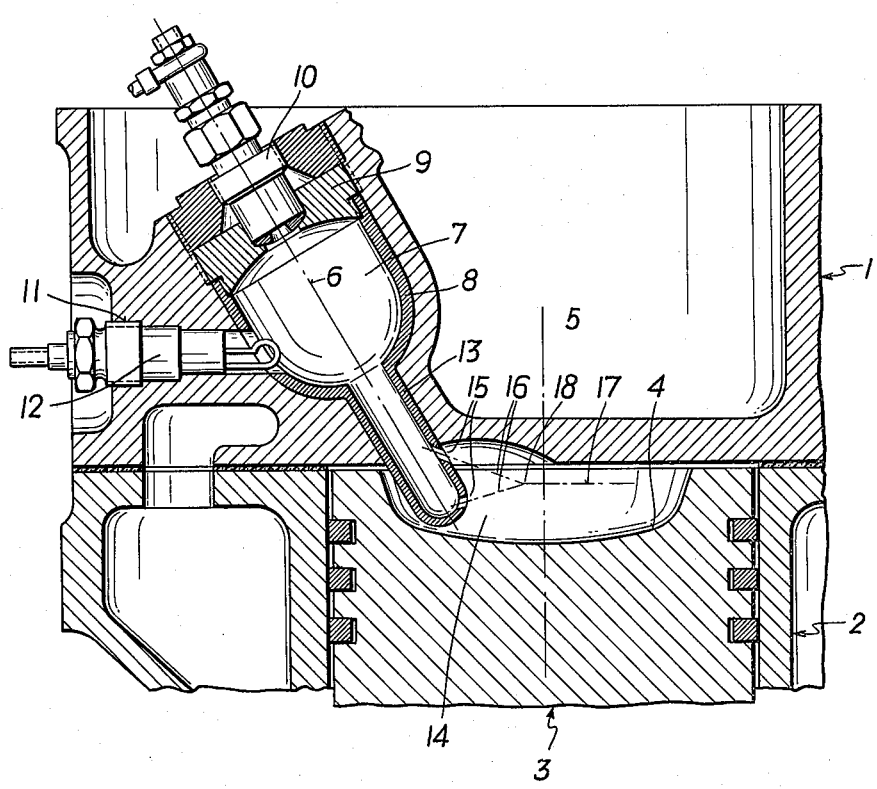

INTERNAL COMBUSTION ENGINE WITH INDIRECT FUEL INJECTION

The invention relates to an internal combustion engine with indirect fuel injection comprising an antechamber or turbulence chamber connected with the combustion-chamber portion located above the piston by means of overflow apertures. With this type of internal combustion engines the fuel is injected into the turbulence or antechamber tied off the combustion chamber portion located above the piston. The combustion commences in the turbulence or ante-chamber with a relatively low NO production on account of the small amount of excess air available there. As a result of the excess pressure produced by the combustion in the antechamber or turbulence chamber, part of the contents of the chamber is blown through the overflow apertures into the combustion chamber portion located above the piston, the still unburned portion of the fuel being thereby introduced into the combustion chamber portion located above the piston and at the same time mixed with the air of this combustion chamber portion located above the piston and burnt therein.

In order to obtain a high degree of efficiency and to avoid smoke formation, an effort should be made to achieve rapid and possibly complete combustion, and above all, to speed up combustion shortly before its completion. Experience has shown that the presence of vehement turbulence in the cylinder charge helps expedite the combustion of the gas-and-fuel mixture.

It is the purpose of the present invention to provide in connection with an internal combustion engine with indirect fuel injection into an antechamber or turbulence chamber, for combustion to occur in the combustion chamber portion located above the piston and for a pressure pattern in said portion in such a manner that on the one hand, the NO content of the exhaust gas is reduced and on the other hand, speedy combustion of the fuel particles flowing in behindmost is ensured, so that the combustion process is terminated in due course, thus achieving smokeless combustion to a high degree. For that purpose, according to the invention at least two overflow apertures are provided whose axes cross or intersect in the portion of the combustion chamber located above the piston. As a result of this arrangement of the overflow apertures between the antechamber or turbulence chamber and the combustion-chamber portion located above the piston as different from conventional design, the exhaust-gas-and-air currents flowing through the overflow apertures into the combustion chamber portion located above the piston collide in the area of the crossings or intersections of the axes of these apertures. This produces in these areas during the second stage of combustion vehement turbulence in the combustion chamber portion above the piston, thereby expediting the completion of the combustion process. It is also possible to time the outflow from the turbulence chamber or antechamber by the number of the overflow apertures on the one hand, and by their size on the other hand, so as to obtain the required combustion pattern. As a rule, an effort will be made to produce a type of combustion accompanied by moderate pressure increase or proceeding at an approximately uniform pressure in the cylinder. This simultaneously also reduces combustion noises.

The shortening of the overall time required for combustion resulting from the invention makes it possible to advance the commencement of fuel injection and consequently, the ignition point as compared with conventional antechamber or turbulent-chamber engines. This not only meets the requirements of complete combustion but leads also to a substantial lowering of the combustion chamber temperature, thus reducing the overall thermal load of the engine.

According to another feature of the invention, the axes of the overflow apertures are coplanar with the cylinder axis. As a result of this particular arrangement of the overflow apertures the exhaust-gas-and-air currents colliding at the intersections of the overflow apertures spread after the impact approximately fan-like in a plane in perpendicular relation to the plane including the cylinder axis and the overflow apertures, thereby taking full advantage of the combustion chamber portion located above the piston.

According to a further feature of the invention the axis of the overflow apertures form at least approximately identical acute angles with a reference plane in perpendicular relation to the cylinder axis. This arrangement takes the usually flat shape of the combustion chamber portion located above the piston duly into account.

Experience has shown the efficiency of the provisions according to the invention intended to improve combustion conditions to be enhanced to a surprising extent by simultaneously adopting other measures designed to produce a turbulence of the cylinder charge. According to another embodiment of the invention the combustion air introduced into the combustion chamber is subdivided in the area of the inlet port system into branch currents rotating in opposition in relation to the cylinder axis and colliding inside the combustion chamber portion located above the piston. The turbulence produced by the collision of the branch currents whose relative force can be varied as required by appropriately sizing the branch currents in such a manner that the degree of turbulence and the extent of the resulting rotational force of the resulting rotational flow of the cylinder charge will meet any given requirements, is largely lost for that part of the air which enters the antechamber or turbulence chamber through the overflow apertures during the compression stage, while it is substantially preserved in the combustion chamber portion located above the piston and contributes decisively towards the acceleration of the mixture formation and combustion. By means of the particular arrangement of the overflow apertures according to the invention the loss of turbulence suffered by the air portion entering the antechamber or turbulence chamber is not only compensated for, but the overall turbulence effective in the combustion chamber portion located above the piston is even considerably increased. By means of a combination of these different provisions the advantages of turbulence production by branch currents will become increasingly effective for an internal combustion engine comprising an antechamber or turbulence chamber.

Further details of the invention will become apparent from the following description of an embodiment of the invention with reference to the accompanying drawing comprising a single figure showing a cross-section of an antechamber engine according to the invention through the cylinder axis, the illustration being limited to such details as are essential for the comprehension of the invention.

The cylinder head 1 and the cylinder block 2 of the antechamber internal combustion engine are illustrated only partially. The same holds true for the piston 3 with the combustion chamber trough 4 provided in the piston bottom.

Tightly inserted in the cylinder head 1 is an insert 8 with an axis 6 inclined in relation to the cylinder axis 5 and including the antechamber 7 and closed at one extremity by means of a plug 9 into which the injection nozzle 10 protrudes.

Screwed into a lateral bore 11 of the cylinder head 1 extending also into the insert 8, is a spark plug 12 protruding into the antechamber 7.

The narrowed extension 13 of the insert 8 located opposite the plug 9 protrudes into the combustion chamber portion 14 defined by the combustion chamber trough 4 in the piston 3. At its extremity, the extension 13 has two overflow apertures 15 whose axes 16 intersect in the combustion chamber portion 14. In the embodiment shown the axes 16 of the overflow apertures 15 are coplanar with the cylinder axis 5 and the axes 16 form at least approximately identical angles with a plane 17 normal to the cylinder axis 5.

As a result of this arrangement, part of the content of the antechamber 7 is blown through the overflow apertures 15 into the combustion chamber portion 14 as a result of excess pressure produced by the combustion in the antechamber, the exhaust-gas-and-air currents emerging through the two overflow apertures colliding in the area of the intersection 18 of the axes 16 of the overflow apertures 15, thereby causing vehement turbulence. The current extends from the intersection 18 essentially fan-like within the normal plane 17. At the same time, the exhaust-gas-and-air current from the antechamber 7 mixes intimately with the air contained in the combustion chamber portion 14. By appropriate measures this portion of the cylinder charge can be imparted a turbulence facilitating mixture formation and further enhancing the combustion process improved by the particular arrangement of the overflow apertures 15 according to the invention.

I claim:

1. In an internal combustion engine with indirect fuel injection, a cylinder having a cylinder axis, a piston located in said cylinder and having a piston head, a trough-shaped recess provided in said piston head, a cylinder head, a main combustion chamber formed between the cylinder head and the piston head, a hollow insert disposed in the cylinder head and having an axis forming an acute angle with the cylinder axis, said insert forming an auxiliary combustion chamber, a plug closing said insert at one end and having a central bore, a fuel injection nozzle protruding into said central bore in alignment with the axis of said insert, a lateral bore in the cylinder head extending also into said insert, a spark plug disposed in said lateral bore and protruding into said insert, the insert having an axial extension opposite the fuel injection nozzle and having a smaller diameter than the remaining portion of the insert, said extension protruding into the main combustion chamber in a peripheral area of said trough-shaped recess of the piston head, two overflow apertures provided in said extension and having axes being coplanar with the cylinder axis and intersecting inside the main combustion chamber, said axes of the overflow bores forming identical acute angles with a reference plane which is normal to the cylinder axis.

2. In the internal combustion engine according to claim 1, wherein the auxiliary combustion chamber is designed as an antechamber.

3. In the internal combustion engine according to claim 1, wherein the main combustion chamber is designed as a turbulence chamber.

* * * * *